(12) United States Patent
Wilcox

(10) Patent No.: US 8,707,072 B2
(45) Date of Patent: *Apr. 22, 2014

(54) INTERFACE FREQUENCY MODULATION TO ALLOW NON-TERMINATED OPERATION AND POWER REDUCTION

(75) Inventor: Jeffrey R. Wilcox, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,187

(22) Filed: May 12, 2011

(65) Prior Publication Data

US 2011/0276815 A1    Nov. 10, 2011

Related U.S. Application Data

(63) Continuation of application No. 11/502,650, filed on Aug. 11, 2006, now Pat. No. 7,945,793.

(51) Int. Cl.
    *G06F 1/26*    (2006.01)
(52) U.S. Cl.
    USPC .............................. 713/320; 326/30; 365/226
(58) Field of Classification Search
    USPC .............................. 713/320; 326/30; 365/226
    See application file for complete search history.

(56) References Cited

U.S. PATENT DOCUMENTS

| | | |
|---|---|---|
| 6,820,169 B2 | 11/2004 | Wilcox et al. |
| 6,944,084 B2 | 9/2005 | Wilcox |
| 6,988,211 B2 | 1/2006 | Cline et al. |
| 7,000,065 B2 | 2/2006 | Wilcox et al. |
| 2002/0144166 A1 | 10/2002 | Chang et al. |
| 2003/0206164 A1 | 11/2003 | Juenger |
| 2003/0235107 A1 | 12/2003 | Jang |
| 2005/0264316 A1 | 12/2005 | Atkinson |
| 2005/0264361 A1 | 12/2005 | Prodanov |
| 2005/0273633 A1 | 12/2005 | Wilcox et al. |
| 2005/0273635 A1 | 12/2005 | Wilcox et al. |

FOREIGN PATENT DOCUMENTS

EP    0 818 734 A2    1/1998

OTHER PUBLICATIONS

Office Action Received for United Kingdom Patent Application No. 0715291.1, mailed on Jan. 16, 2008, 7 pages of Office Action.
Office Action Received for U.S. Appl. No. 11/502,650, mailed on Jun. 10, 2010, 6 pages.
Office Action Received for U.S. Appl. No. 11/502,650, mailed on Sep. 29, 2009, 10 pages.
Notice of Allowance Received for U.S. Appl. No. 11/502,650, mailed on Jan. 5, 2011, 4 pages.
Office Action Received for Chinese Patent Application No. 200710142312.6, mailed on Apr. 25, 2008, 3 pages of Office Action and 4 pages of English Translation.
Notice of Allowance Received for Chinese Patent Application No. 200710142312.6, mailed on May 8, 2009, 2 pages of Notice of Allowance and 2 pages of English Translation.

(Continued)

*Primary Examiner* — Albert Wang
(74) *Attorney, Agent, or Firm* — Caven & Aghevli LLC

(57) ABSTRACT

Embodiments of the invention are generally directed to systems, methods, and apparatuses for using interface frequency modulation to allow non-terminated operation and power reduction. In some embodiments, an apparatus includes an interface having a termination mode and a power management controller coupled with the interface. The apparatus may also include a power management controller coupled with the interface. In some embodiments, the power management controller is capable of dynamically reducing the operating frequency of the interface and disabling the termination mode to reduce the power consumed by the interface. Other embodiments are described and claimed.

22 Claims, 6 Drawing Sheets

(56) References Cited

OTHER PUBLICATIONS

Office Action Received for Taiwan Patent Application No. 96129630, mailed on Nov. 15, 2010, 3 pages of Office Action and 1 page of English Translation.

Notice of Allowance Received for Taiwan Patent Application No. 96129630, mailed on May 27, 2011, 2 pages of Notice of Allowance and 1 page of English Translation.

Office Action Received for German Patent Application No. 102007037601.6, mailed on Jan. 9, 2012, 3 pages of Office Action and 2 pages of English Translation.

Office Action Received for German Patent Application No. 102007037601.6, mailed on Feb. 15, 2011, 2 pages of Office Action and 2 pages of English Translation.

Office Action Received for German Patent Application No. 102007037601.6, mailed on May 17, 2010, 3 pages of Office Action and 2 pages of English Translation.

"Enhanced Intel Speed Step Technology for the Intel Pentium M Processor", White Paper, Mar. 2004, Order No. 301170-00 I, 12 pages.

Micron, "DDR2 Offers New Features and Functionality", design line, 3Q03, vol. 12, issue 2, 16 pages.

Elpida, "New Function of DDR2 SDRAM on Die Termination (ODT)", Technical Note, Elpida Memory, Inc. 2005, document No. E0593EIO, Japan, Version 1.0, Published Jan. 2005.

Venkatachalam et al., "Power Reduction Techniques for Microprocessor Systems", ACM Computing Surveys, vol. 37, No. 3, Sep. 2005, pp. 195-237, University of California, Irvine.

Bodas et al., "New Server Power-Management Technologies Address Power and Cooling Challenges", Technology@Intel Magazine, Sep. 2003, 6 pages.

Intel, "Wireless Intel Speed Step Power Manager", Optimizing Power Consumption for the Intel PXA27x Processor Family, White Paper, Copyright 2004, Intel 300577-001, 16 pages.

Office Action received for German Patent Application No. 102007037601.6, mailed on Apr. 30, 2013, 8 pages of Office Action and 5 pages of English translation.

Electronic Industries Association/ JEDEC Standard, "High Speed Transceiver Logic (HTSL)—A 1.5 V Output Buffer Supply Voltage Based Interface Standard for Digital Integrated Circuits", Aug. 1995, 16 pages.

Altera Corporation, "Stratix II FPGA DDR2 Memory Interface Termination, Drive Strength & Loading Design Guidelines", Application Note 408, Ver. 1.0, Jan. 2006, 38 pages.

US 8,707,072 B2

INTERFACE FREQUENCY MODULATION TO ALLOW NON-TERMINATED OPERATION AND POWER REDUCTION

RELATED APPLICATION

The present application claims priority from and is a continuation of U.S. patent application Ser. No. 11/502,650, filed Aug. 11, 2006, entitled "INTERFACE FREQUENCY MODULATION TO ALLOW NON-TERMINATED OPERATION AND POWER REDUCTION", issued as U.S. Pat. No. 7,945,793, on May 17, 2011, which is hereby incorporated herein by reference in its entirety and for all purposes.

TECHNICAL FIELD

Embodiments of the invention generally relate to the field of integrated circuits and, more particularly, to systems, methods and apparatuses for interface frequency modulation to allow non-terminated operation and power reduction.

BACKGROUND

The operating frequencies of integrated circuits such as memory devices are progressively increasing. To take advantage of these high frequencies computing systems are designed to transmit signals along their busses and between system components at comparable frequencies.

Some difficulties may be encountered when transmitting and receiving data between system components (e.g., between integrated circuits) at high frequencies. Buses behave like transmission lines, where impedance mismatches lead to signal reflection and interference effects. Termination resistance can be used to maintain signal quality over interconnections by matching impedances to minimize signal reflections.

Some conventional memory systems, such as double data rate (DDR) 2 systems use on-die termination to mitigate the signal degradation. The term "on-die termination (ODT)" refers to a termination resistance that is resident on the integrated circuit (e.g., on the controller and/or on the memory device). The value of ODT may be set when a computing system is initialized. After initialization, the ODT can be activated or deactivated with the value that is set during initialization.

In conventional systems, the decision to use a termination mode is based on the signal integrity requirements for the desired maximum operating frequency. The term "termination mode" refers to using termination on one or both sides of an interconnect. When operating in a termination mode, the termination may be constantly on or it may be dynamically turned on and off (e.g., when transmit and/or receive data is sent over the interconnect). The termination mode is frequently used to support the high data rates of conventional systems. The use of the termination mode incurs a significant price in terms of power consumption. For example, a termination mode may support a lower impedance current path that may result in power consumption both when signals are toggling on the interconnect and when they are held constant on the interconnect.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for interface frequency modulation to allow non-terminated operation and power reduction. In some embodiments, an apparatus includes an interface having dynamic on-die termination and a power management controller coupled with the interface. The term "power management controller" is shorthand for any collection of logic that performs (at least some of) the functions of the power management controller. The collection of logic that constitutes the power management controller may be substantially located in one region of an integrated circuit or may be distributed across a number of different integrated circuits. In addition, aspects of the power management controller may be implemented in hardware, firmware, software, or any combination thereof. In some embodiments, the power management controller is capable of dynamically reducing an operating frequency of the interface so that it is low enough to allow for non-terminated operation. The power management controller may then disable the dynamic on-die termination mode of the interface. Thus, termination power can be saved whenever it is appropriate to operate the interface in a lower frequency mode.

Figure 1:
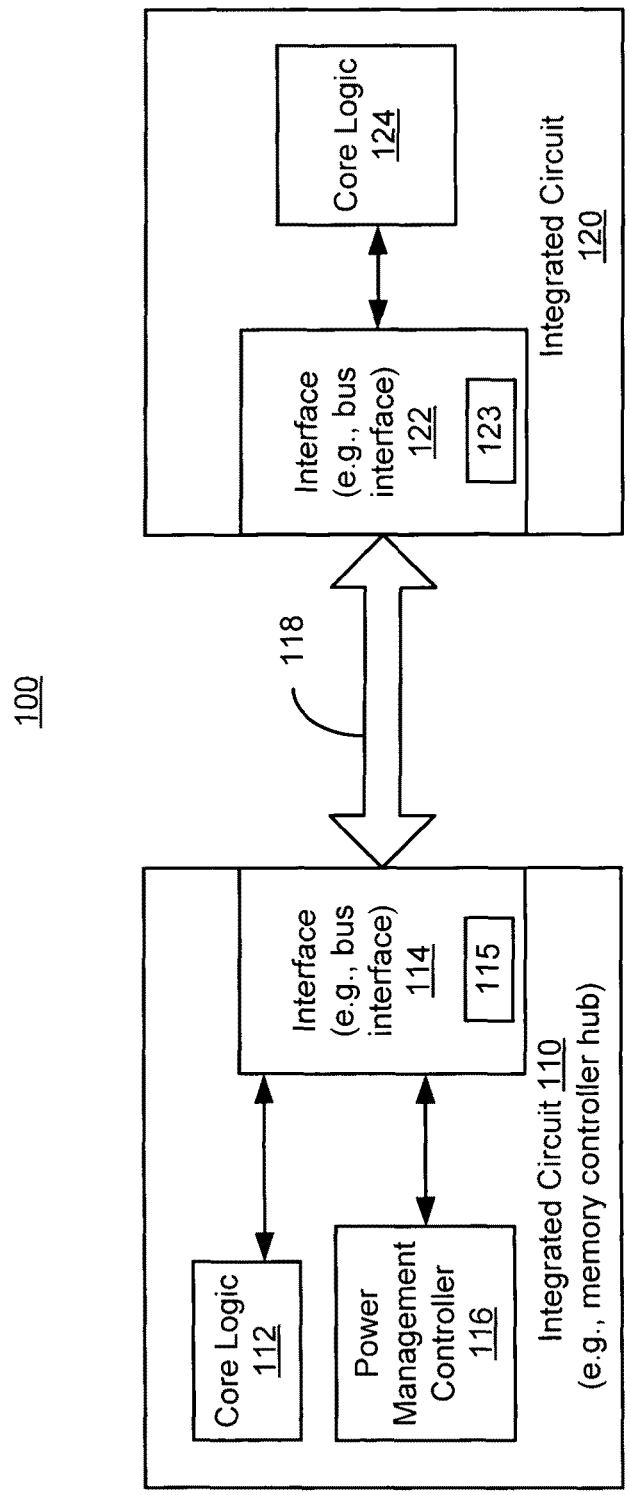
FIG. 1 is a block diagram illustrating selected aspects of a computing system, implemented according to an embodiment of the invention.

FIG. 1 is a block diagram illustrating selected aspects of a computing system, implemented according to an embodiment of the invention. System 100 includes integrated circuit 110 and integrated circuit 120 coupled together by interconnect 118. Integrated circuits 110 and 120 may be nearly any integrated circuits including processors, controllers, memory devices, and the like. For example, in some embodiments, integrated circuit 110 is a memory controller hub and integrated circuit 120 is a dynamic random access memory device (DRAM). In alternative embodiments, one or both of integrated circuits 110 and 120 may be processors.

Integrated circuit 110 includes core logic 112, interface 114, and power management controller 116. Core logic 112 may be nearly any core logic of an integrated circuit including, for example, a processor core, a controller, a memory array, and the like. Interface 114 provides an interface between integrated circuit 110 and interconnect 118. Interconnect 118 may be any of a wide variety of interconnects having interfaces that are terminated such as a point-to-point interconnect or a multi-drop interconnect. For example, in some embodiments, memory interconnect 118 is a DDR2 bus. In such embodiments, interface 114 may be a DDR controller. In some embodiments, interface 114 includes termination logic 115 to provide termination for interconnect 118.

Power management controller 116 uses dynamic interface frequency modulation to manage the power consumed by one or more of the interfaces of integrated circuit 110. In some embodiments, controller 116 detects an indication of a power reduction condition. The term "power reduction condition" refers to any of a wide range of conditions that indicate that the power consumed by an integrated circuit should be reduced. Examples of a power reduction condition include, and are not limited to, an over temperature condition, a bandwidth usage that trips a threshold, and/or placing the integrated circuit in a reduced power mode (e.g., a battery optimized mode).

In some embodiments, controller 116 quiesces the interface if it detects a power reduction condition. The controller may then dynamically reduce the frequency of the interface until it is low enough that a termination mode is no longer needed. In some embodiments, the controller disables the termination mode associated with the interface when its frequency is sufficiently reduced (e.g., termination logic 115 and/or termination logic 123). The amount of power consumed by the interface may then be reduced because the interface is no longer terminated. In some embodiments, the controller reactivates the interface once the frequency has been reduced and the termination mode has been disabled. Controller 116 is further described below with reference to FIGS. 2-5.

For ease of illustration, the power management controller is illustrated as a single functional block. It is to be appreciated, however, that the power management controller may be any collection of logic that performs (at least some of) the functions of the power management controller. The collection of logic that constitutes the power management controller may be substantially located in one region of an integrated circuit (e.g., a region of integrated circuit 110), or aspects of it may be distributed in nearly any manner across an integrated circuit, or aspects of it may be distributed across almost any number of different integrated circuits. In addition, aspects of the power management controller may be implemented in hardware, firmware, software, or any combination thereof.

Integrated circuit 120 includes core logic 124 and interface 122. Core logic 124 may be nearly any core logic of an integrated circuit including, for example, a processor core or a memory array. Interface 122 provides an interface between integrated circuit 120 and interconnect 118. In some embodiments, interface 122 includes termination logic 123 to provide termination for interconnect 118.

Figure 2:
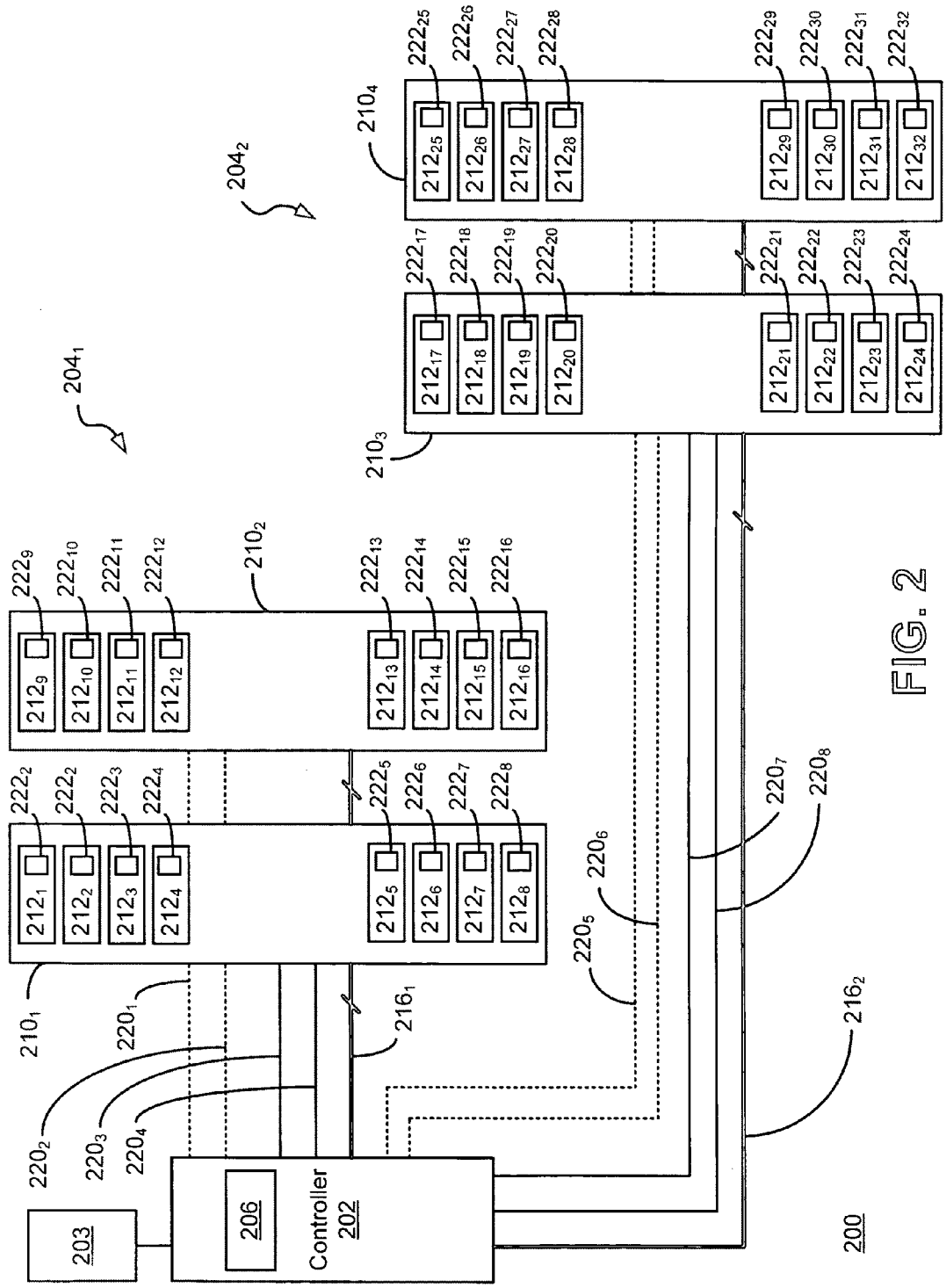
FIG. 2 is a high-level block diagram illustrating selected aspects of a computing system, implemented according to an embodiment of the invention.

FIG. 2 is a high-level block diagram illustrating selected aspects of a computing system implemented according to an embodiment of the invention. Computing system 200 includes controller 202 and two memory channels 204. Controller 202 may be any type of controller suitable for controlling, at least in part, the transfer of information between a processor (not shown) and one or more integrated circuits (e.g., memory devices). Controller 202 includes on-die termination (ODT) logic 206. Controller 202 may also be coupled with power management controller 203. In some embodiments, power management controller 203 is capable of dynamically modulating the frequency of controller 202 and selectively disabling or enabling ODT logic 206 to alter the amount of power consumed by controller 202.

Memory channels 204 include memory modules 210 each having, for example, two ranks of memory devices (e.g., one on either side). Memory modules 210 may be based on printed circuit boards having fingers along both sides of one edge to create a dual inline memory module (DIMM) that may be plugged into a connector on another circuit board that holds other components of the system. Modules 210 are populated with memory devices 212. One or more of memory devices 212 may include ODT logic 222. In some embodiments, power management controller 203 may dynamically disable and/or enable ODT logic 222 to control the amount of power consumed by system 200. The memory devices may be commodity-type dynamic random access memory (DRAM) such as double data rate (DDR) DRAM. In an embodiment, each module 210 includes two ranks (e.g., one on each side of the module).

In an embodiment, controller 202 is coupled with modules 210 via interconnect 216. Interconnect 216 may include any number of data lines, address lines, chip select lines and/or other lines. In addition, memory controller 202 is coupled with each rank via on-die termination (ODT) lines 220. In an embodiment, ODT lines 220 provide ODT activation signals for memory devices 212. An ODT activation signal refers to a signal that activates ODT (e.g., dynamically enables ODT logic 222) for an integrated circuit or a group of integrated circuits. In some embodiments, the ODT activation signal activates ODT for an entire rank of memory devices 212. In such embodiments, the ODT pins for the memory devices within a rank may be daisy-chained together so that the same ODT signals are routed to the memory devices within the rank.

The number of memory channels, memory modules, and memory devices shown in FIG. 1 are for illustrative purposes. An embodiment of the invention may have a different number of memory channels, a different number of memory modules, and/or a different number of memory devices. In addition, the topology and architecture illustrated in FIG. 1 are for illustrative purposes. An embodiment of the invention may have a different topology and/or different architectural features.

Figure 3:
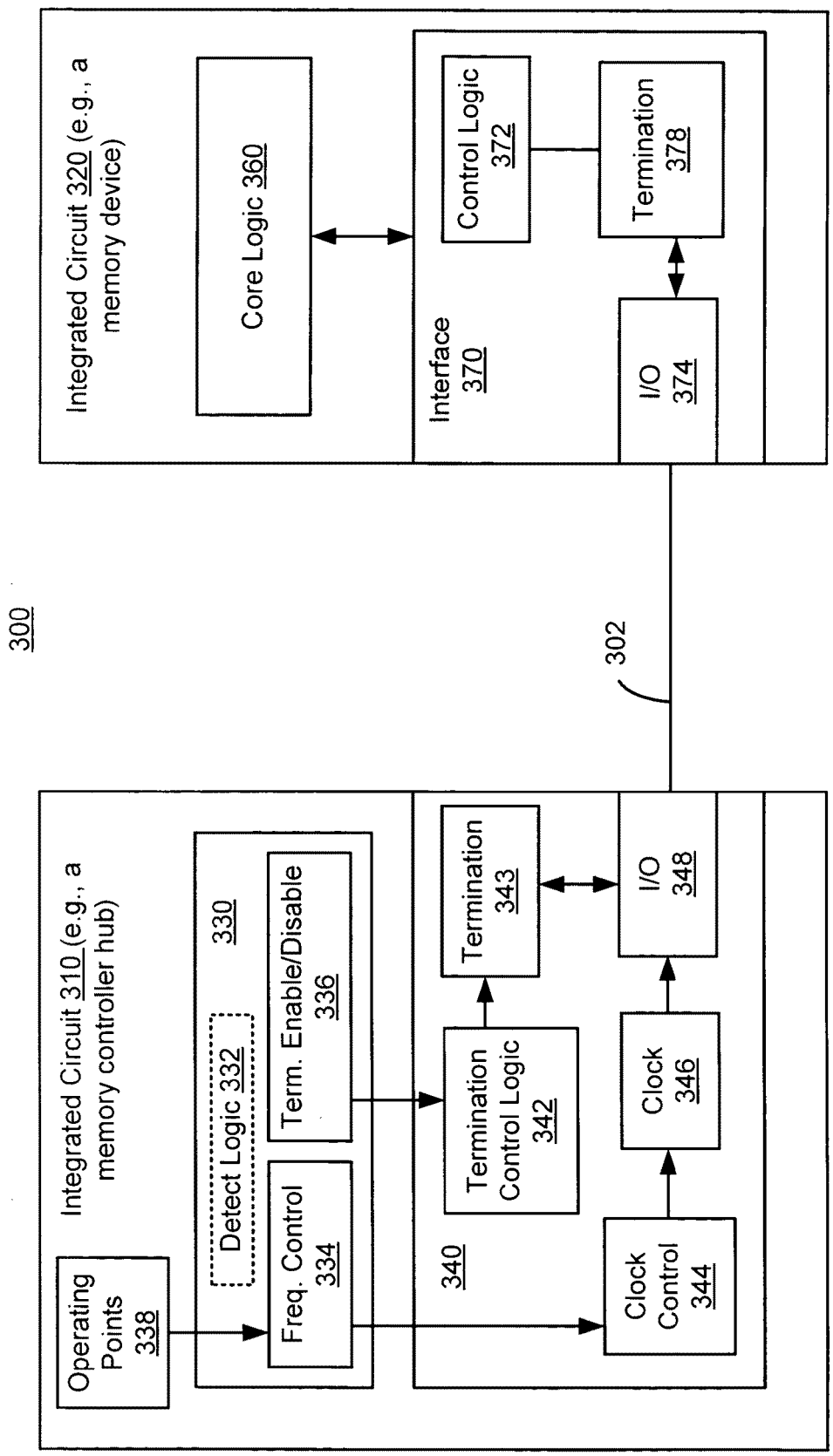
FIG. 3 is a block diagram illustrating selected aspects of a power management controller, implemented according to an embodiment of the invention.

FIG. 3 is a block diagram illustrating selected aspects of a system using a power management controller, according to an embodiment of the invention. System 300 includes integrated circuit (IC) 310 and IC 320 coupled together by interconnect 302. Interconnect 302 may be any of a wide range of interconnects including a front side bus and/or a memory interconnect. In the illustrated embodiment, IC 310 includes power management controller 330 and interface 340.

Power management controller 330 includes frequency control logic 334 and termination mode enable/disable logic 336. Frequency control logic 334 may be any logic capable of controlling the frequency at which interface 340 operates. For example, in some embodiments, frequency control logic 334 is control logic for a phase locked loop (PLL) or a delay locked loop (DLL). In other embodiments, frequency control logic 334 may be nearly any clock controller logic suitable for controlling a clocking frequency.

Termination mode enable/disable logic 336 may be any logic suitable for enabling or disabling the termination mode of an interface. In some embodiments, termination control 342 is a driver that drives termination 343 (and/or termination 378). In addition, termination control logic 342 may also drive the signals that turn termination resistance logic 378 on and off. Termination mode enable/disable logic 336 may be, for example, any logic suitable for turning a driver on and off.

In some embodiments, the controls for ODT for signals in both directions is managed by one side of an interface. In alternative embodiments, the ODT on each side of an interface is separately controlled. In such alternative embodiments, the termination mode enable/disable logic may be capable of enabling/disabling the ODT on the "local" side of the interconnect and also of communicating with the "remote" side of the interconnect to enable/disable the ODT on the remote side. This communication may occur through, for example, a side band channel, a configuration channel, and the like.

Power management controller 330 may, optionally, include detect logic 332. Detect logic 332 detects an indication that a power reduction condition is occurring (and/or has occurred and/or will occur). In some embodiments, detect logic 332 is implemented in microcode on IC 310. In alternative embodiments, detect logic 332 may be implemented in hardware on IC 310. In yet other alternative embodiments, detect logic 332 is implemented in software running on a processor (e.g., processor 102) shown in FIG. 1).

Interface 340 provides an interface between IC 310 and interconnect 302. In some embodiments, interface 340 may be part of a memory controller (e.g., a DDR controller). In alternative embodiments, interface 340 may be part of a processor interface (e.g., processor I/F 112, shown in FIG. 1). Interface 340 may operate at a frequency that is determined by clock 346. Clock control logic 344 determines the clocking frequency of clock 346. In some embodiments, clock control logic 344 dynamically changes the clocking frequency of clock 346 in response to an indication from frequency control logic 334. Input/output (I/O) circuit 348 may include any number of receivers and/or drivers suitable for communicating over interconnect 302.

In some embodiments, operating points 338 determine discrete operating conditions and/or modes. For example, operating points 338 may determine particular frequencies at which interconnect 302 can operate and may indicate whether the termination mode is to be used with a particular frequency. In some embodiments, operating points 338 define a high frequency mode (HFM) and a low frequency mode (LFM). The HFM may include a relatively high operating frequency (e.g., 800 mega transfers per second (MT/S)) and may indicate that the termination mode is to be used when operating at that frequency. In contrast, the LFM may include a relatively low operating frequency (433 or 400 MT/S) and may indicate that the termination mode is not to be used when operating at that frequency.

IC 320 includes core logic 360 and interface 370. Core logic 360 may be any core logic of an IC including, for example, an array of memory cells. Interface 370 provides an interface between IC 320 and interconnect 302 and may include, for example, control logic 372, termination 378, and I/O circuit 374. Control logic 372 may include logic to enable or disable termination 378. In some embodiments, termination mode enable/disable logic 336 dynamically signals control logic 372 to enable or disable termination 378. In some embodiments, termination mode enable/disable logic 336 uses side-band communication to dynamically signal control logic 372. Termination 378 may be any of a wide range of on-die termination circuits capable of providing on-die termination for interconnect 302. I/O circuit 374 may include any number of receivers, drives, buffers, and the like.

Figure 4:
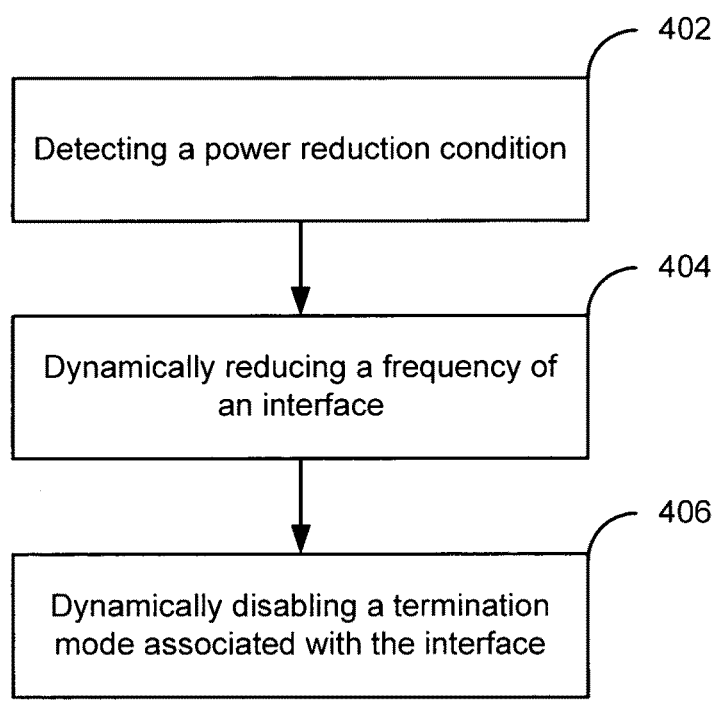
FIG. 4 is a high-level flow diagram illustrating selected aspects of a method for using interface frequency modulation to allow non-terminated operation and power reduction, according to an embodiment of the invention.

FIG. 4 is a high-level flow diagram illustrating selected aspects of a method for using interface frequency modulation to allow non-terminated operation and power reduction, according to an embodiment of the invention. Referring to reference number 402, a power management controller detects a power reduction condition. Detecting a power reduction condition broadly refers to detecting any of a wide-range of conditions indicating that it may be desirable to reduce the power consumed by a system. Examples of detecting a power reduction condition include: detecting an over temperature condition, detecting an indication that bandwidth usage of the interconnect is below a threshold, detecting an indication that the system is in a battery optimized mode, and detecting that a high bandwidth agent is coupled with the interconnect. A high bandwidth agent may be any agent that consumes a significant amount of interconnect bandwidth including, for example, a graphics engine.

Referring to process block 404, the power management controller dynamically reduces the frequency of the interface so that the interface can be operated in a non-terminated mode. In some embodiments, a PLL controller may change the clock frequency. In alternative embodiments, different control mechanisms may be used to change clock frequency.

Referring to process block 406, the power management controller dynamically disables the termination mode associated with the interface. Power can be saved when the termination mode is disabled because, in the non-terminated mode, very little power is consumed during stable periods when signals on the interconnect are not toggling. The termination mode is disabled by turning off a driver that drives the termination resistance. In some embodiments, disabling the termination mode includes turning off a driver that drives the termination on one or both ends of an interconnect. In alternative embodiments, disabling the termination mode may include turning off a driver on both sides of the interconnect. In yet other alternative embodiments, different mechanisms may be used to dynamically disable the termination mode of the interface.

Figure 5:
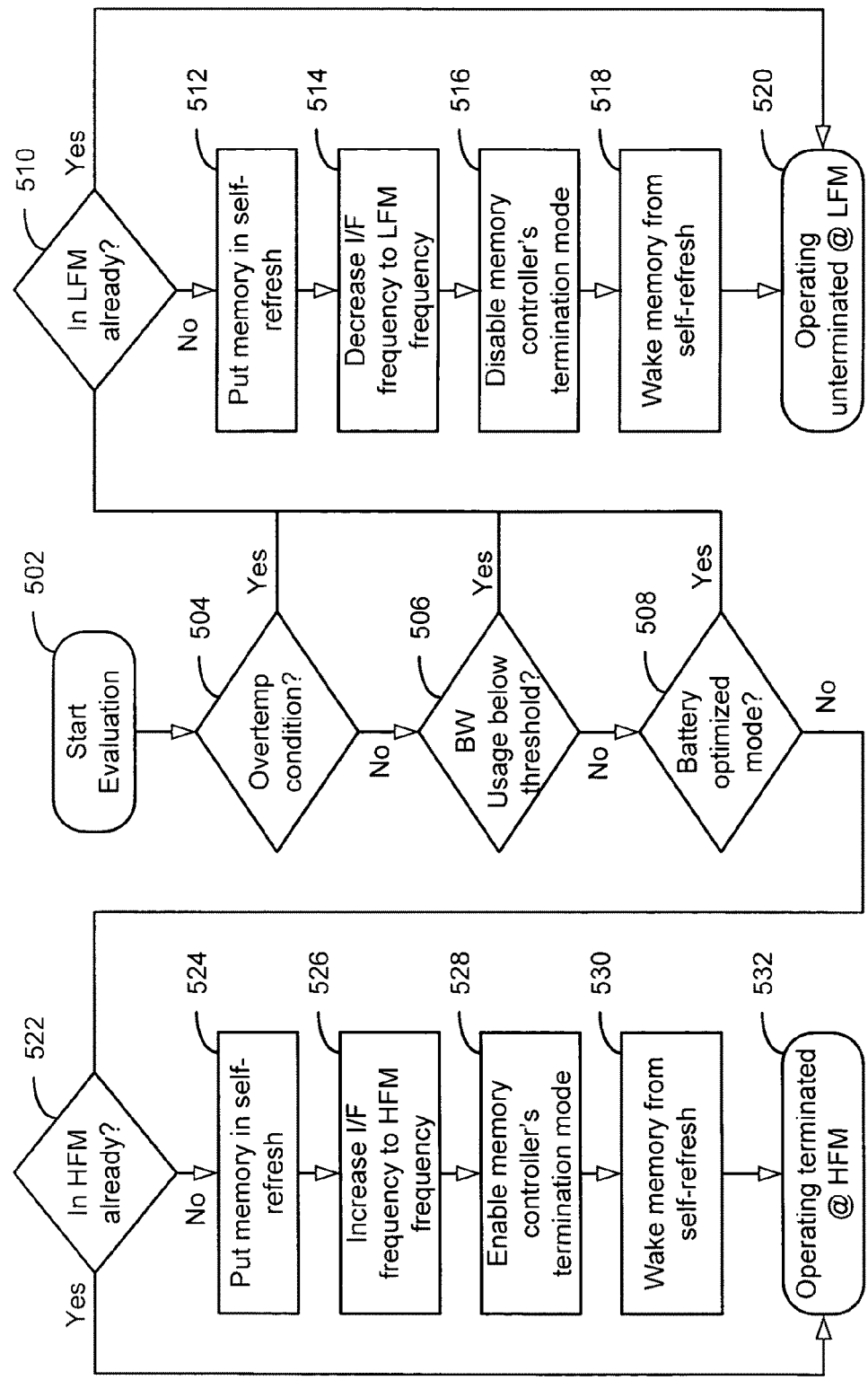
FIG. 5 is a flow diagram illustrating selected aspects of a method for using interface frequency modulation to allow non-terminated operation and power reduction in a memory system, according to an embodiment of the invention.

FIG. 5 is a flow diagram illustrating selected aspects of a method for using interface frequency modulation to allow non-terminated operation and power reduction in a memory system, according to an embodiment of the invention. Referring to process block 502, a power management controller starts an evaluation to determine whether or not to change the operating point of one or more interfaces coupled with a memory interconnect. The evaluation may occur periodically, and/or in response to one or more events, and/or in response to an operator's instructions, and/or any combination thereof.

Process blocks 504 through 508 illustrate a number of power reduction conditions that may trigger a change in an operating point, according to an embodiment of the invention. The power management controller determines whether there is an over temperature condition at 504. This determination may be based, at least in part, on the output provided by one or more thermal sensors. At 506, the power management controller determines whether the bandwidth usage of the interconnect is below a threshold. This determination may be based, at least in part, on bandwidth monitors associated with the interface. The power management controller determines whether the system is in a battery optimized mode at 508. In some embodiments, this determination is based, at least in part, on whether the controller receives an indication that the system is in a battery optimized mode. The battery optimized mode may be any reduced power mode where the system is (at least partly) optimized for reduced power consumption (at the possible cost of reduced performance) such as provided by SpeedStep Technology (or enhanced SpeedStep Technology). In alternative embodiments, more conditions, fewer conditions, and/or different conditions may be used.

If one or more of the power reduction conditions are present, then the power management controller determines whether the interface is in a low frequency mode (LFM) at 510. The term "LFM" broadly refers to operating at a frequency that is low enough that it is not necessary to use the termination mode on the interface. In some embodiments, the power management controller determines whether the interface is in an LFM by determining which operating point the interface is using. In alternative embodiments, other mechanisms may be used to determine whether the interface is in an LFM. If the interface is already operating in an LFM, then the interface remains non-terminated and in the LFM as shown by 520.

If, however, the interface is not in an LFM, then the power management controller places the memory in self-refresh to quiesce the interface as shown by 512. The power management controller decreases the interface frequency to one defined to be suitable for an LFM. For example, in some embodiments, the power management controller sets the interface to an operating point having a lower frequency. The power management controller disables the memory controller's termination mode at 516. The termination mode may be disabled by, for example, turning one or more drivers off.

If none of the power reduction conditions are present, then the power management controller determines whether the interface is in a high frequency mode (HFM) at 522. The term "HFM" broadly refers to operating at a frequency that is high enough to indicate that the termination mode should be used on the interface. In some embodiments, the power management controller determines whether the interface is in an HFM by determining which operating point the interface is using. In alternative embodiments, other mechanisms may be used to determine whether the interface is in an HFM. If the interface is already operating in an HFM, then the interface remains terminated and in the HFM as shown by 532.

If, however, the interface is not in an HFM, then the power management controller places the memory in self-refresh to quiesce the interface as shown by 524. The power management controller increases the interface frequency to one defined to be suitable for an HFM at 526. For example, in some embodiments, the power management controller sets the interface to an operating point having a higher frequency. The power management controller enables the memory controller's termination mode at 528. The termination mode may be enabled by, for example, turning one or more drivers on.

Figure 6:
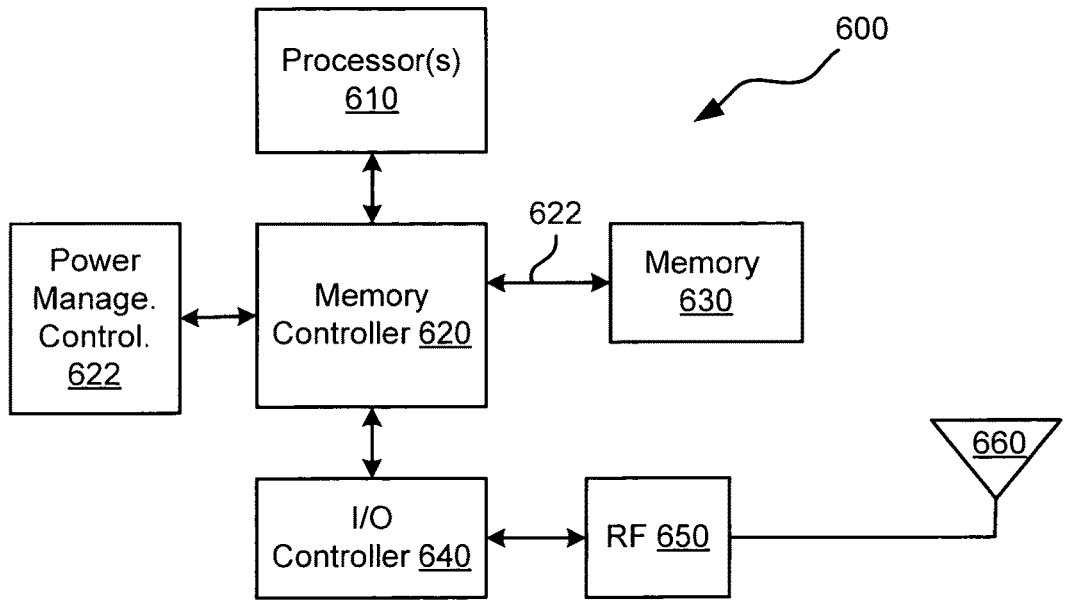
FIG. 6 is a block diagram illustrating selected aspects of an electronic system according to an embodiment of the invention.

FIG. 6 is a block diagram illustrating selected aspects of an electronic system according to an embodiment of the invention. Electronic system 600 includes processor 610, memory controller 620, memory 630, input/output (I/O) controller 640, radio frequency (RF) circuits 650, and antenna 660. In operation, system 600 sends and receives signals using antenna 660, and these signals are processed by the various elements shown in FIG. 6. Antenna 660 may be a directional antenna or an omni-directional antenna. As used herein, the term omni-directional antenna refers to any antenna having a substantially uniform pattern in at least one plane. For example, in some embodiments, antenna 660 may be an omni-directional antenna such as a dipole antenna or a quarter wave antenna. Also, for example, in some embodiments, antenna 660 may be a directional antenna such as a parabolic dish antenna, a patch antenna, or a Yagi antenna. In some embodiments, antenna 660 may include multiple physical antennas.

Radio frequency circuit 650 communicates with antenna 660 and I/O controller 640. In some embodiments, RF circuit 650 includes a physical interface (PHY) corresponding to a communication protocol. For example, RF circuit 650 may include modulators, demodulators, mixers, frequency synthesizers, low noise amplifiers, power amplifiers, and the like. In some embodiments, RF circuit 650 may include a heterodyne receiver, and in other embodiments, RF circuit 650 may include a direct conversion receiver. For example, in embodiments with multiple antennas 660, each antenna may be coupled to a corresponding receiver. In operation, RF circuit 650 receives communications signals from antenna 660 and provides analog or digital signals to I/O controller 640. Further, I/O controller 640 may provide signals to RF circuit 650, which operates on the signals and then transmits them to antenna 660.

Processor(s) 610 may be any type of processing device. For example, processor 610 may be a microprocessor, a microcontroller, or the like. Further, processor 610 may include any number of processing cores or may include any number of separate processors.

Memory controller 620 provides a communication path between processor 610 and other elements shown in FIG. 6. In some embodiments, memory controller 620 is part of a hub device that provides other functions as well. As shown in FIG. 6, memory controller 620 is coupled to power management controller 622, processor(s) 610, I/O controller 640, and memory 630. In some embodiments, power management controller 622 dynamically modulates the interface frequency of memory controller 620 so that its termination mode can be selectively enabled or disabled.

Memory 630 may include multiple memory devices. These memory devices may be based on any type of memory technology using termination on its interfaces. For example, memory 630 may be random access memory (RAM), dynamic random access memory (DRAM), static random access memory (SRAM), nonvolatile memory such as FLASH memory, or any other type of memory.

Memory 630 may represent a single memory device or a number of memory devices on one or more modules. Memory controller 620 provides data through interconnect 622 to memory 630 and receives data from memory 630 in response to read requests. Commands and/or addresses may be provided to memory 630 through interconnect 622 or through a different interconnect (not shown). Memory controller 620 may receive data to be stored in memory 630 from processor 610 or from another source. Memory controller 620 may provide the data it receives from memory 630 to processor 610 or to another destination. Interconnect 622 may be a bi-directional interconnect or a unidirectional interconnect. Interconnect 622 may include a number of parallel conductors. The signals may be differential or single ended. In some embodiments, interconnect 622 operates using a forwarded, multiphase clock scheme.

Memory controller 620 is also coupled to I/O controller 640 and provides a communications path between processor(s) 610 and I/O controller 640. I/O controller 640 includes circuitry for communicating with I/O circuits such as serial ports, parallel ports, universal serial bus (USB) ports and the like. As shown in FIG. 6, I/O controller 640 provides a communication path to RF circuits 650.

Figure 7:
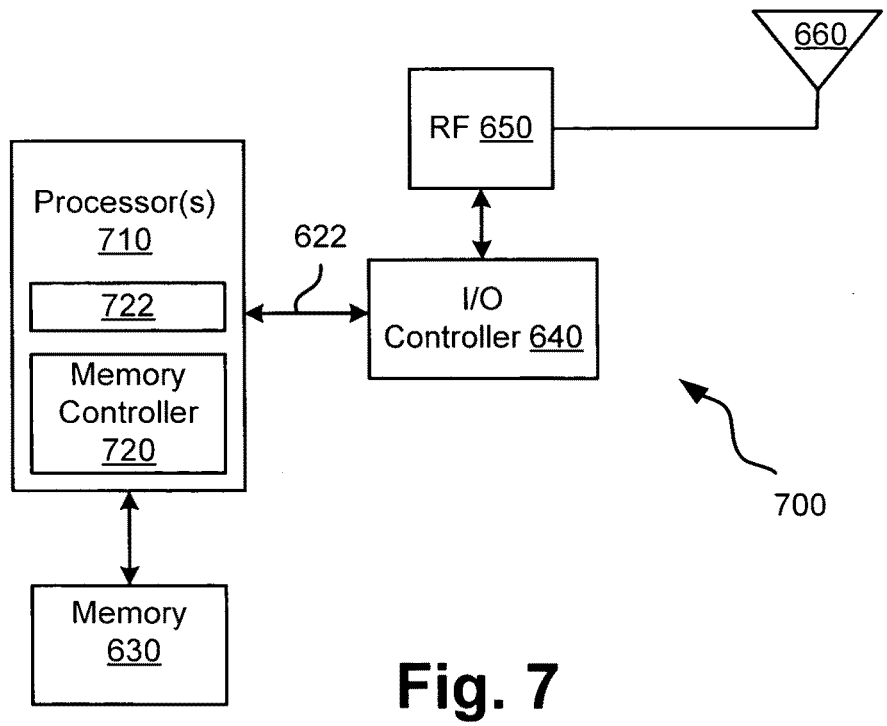
FIG. 7 is a bock diagram illustrating selected aspects of an electronic system according to an alternative embodiment of the invention.

FIG. 7 is a bock diagram illustrating selected aspects of an electronic system according to an alternative embodiment of the invention. Electronic system 700 includes memory 630, I/O controller 640, RF circuits 650, and antenna 660, all of which are described above with reference to FIG. 6. Electronic system 700 also includes processor(s) 710, memory controller 720, and power management controller 722. As shown in FIG. 7, memory controller 720 and power management controller 722 may be on the same die as processor(s) 710. Processor(s) 710 may be any type of processor as described above with reference to processor 610 (FIG. 5). In some embodiments, power management controller 722 dynamically modulates the interface frequency of memory controller 720 so that its termination mode can be selectively enabled or disabled. Example systems represented by FIGS.

6 and 7 include desktop computers, laptop computers, servers, cellular phones, personal digital assistants, digital home systems, and the like.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A dynamic random access memory (DRAM) controller, comprising:
a double data rate (DDR) high-speed DRAM interface to transfer data over a bus, the interface including a dynamic on-die termination mode to dynamically enable and disable a termination resistance for a signal received from the bus during operation of the bus; and
wherein the DRAM controller is to disable the dynamic on-die termination mode and wherein a memory, coupled to the interface, is to be put into self-refresh mode prior to any modification to an operating frequency of the interface and the termination mode.

2. The DRAM controller of claim 1, further comprising frequency control logic to dynamically control the operating frequency of the interface.

3. The DRAM controller of claim 1, further comprising logic to detect a power reduction condition.

4. The DRAM controller of claim 1, further comprising logic to detect a temperature condition.

5. The DRAM controller of claim 1, further comprising logic to detect a bandwidth usage of the bus.

6. The DRAM controller of claim 1, further comprising logic to detect a relationship between a bandwidth usage of the bus and a threshold.

7. The DRAM controller of claim 1, further comprising logic to detect an indication that the DRAM controller is in a battery optimized mode.

8. The DRAM controller of claim 1, further comprising logic to detect whether a high bandwidth agent is coupled to the bus.

9. The DRAM controller of claim 8, wherein the high bandwidth agent comprises a graphics engine.

10. The DRAM controller of claim 1, wherein the bus comprises a memory interconnect.

11. The DRAM controller of claim 1, wherein the bus comprises a processor interconnect.

12. The controller of claim 1, wherein the DRAM controller is to change the operating frequency of the interface prior to the dynamic on-die termination mode being disabled.

13. A memory module, comprising:
one or more double data rate (DDR) high-speed dynamic random access memory (DRAM) devices; and
a DDR high-speed DRAM interface to transfer data over a bus at a first clock frequency, the interface including on-die termination mode logic to enable and disable a termination resistance for a signal received from the bus, wherein the on-die termination mode logic is capable of being set in a dynamic on-die termination mode that causes the termination resistance to be enabled and disabled dynamically during operation of the bus;
the on-die termination mode logic further to:
receive a first command to disable the dynamic on-die termination mode;
in response to receiving the first command, disabling the dynamic on-die termination mode;
wherein one or more of the DRAM devices are to be put into self-refresh mode prior to any modification to an operating frequency of the interface and the on-die termination mode.

14. The memory module of claim 13, further comprising frequency control logic to dynamically control the operating frequency of the interface.

15. The memory module of claim 13, further comprising logic to detect a power reduction condition.

16. The memory module of claim 13, further comprising logic to detect a temperature condition.

17. The memory module of claim 13, further comprising logic to detect a bandwidth usage of the bus.

18. The memory module of claim 13, further comprising logic to detect an indication that the DRAM controller is in a battery optimized mode.

19. The memory module of claim 13, further comprising logic to detect whether a high bandwidth agent is coupled to the bus.

20. The memory module of claim 19, wherein the high bandwidth agent comprises a graphics engine.

21. The memory module of claim 13, wherein the bus comprises a memory interconnect or a processor interconnect.

22. The memory module of claim 13, wherein the first clock frequency is to be changed to a second clock before the dynamic on-die termination mode is disabled.

* * * * *